United States Patent

Matsue et al.

(10) Patent No.: US 10,935,665 B2
(45) Date of Patent: Mar. 2, 2021

(54) SATELLITE RADIOWAVE RECEIVING DEVICE, ELECTRONIC TIMEPIECE, METHOD FOR CONTROLLING POSITIONING OPERATIONS, AND STORAGE DEVICE

(71) Applicant: CASIO COMPUTER CO., LTD., Tokyo (JP)

(72) Inventors: Takeshi Matsue, Kokubunji (JP); Tatsuya Sekitsuka, Kunitachi (JP); Ryuji Shingyoji, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 412 days.

(21) Appl. No.: 16/135,383

(22) Filed: Sep. 19, 2018

(65) Prior Publication Data

US 2019/0094381 A1 Mar. 28, 2019

(30) Foreign Application Priority Data

Sep. 25, 2017 (JP) .............................. JP2017-183187

(51) Int. Cl.
*G01S 19/28* (2010.01)
*G01S 19/40* (2010.01)
*G01S 19/20* (2010.01)
*G01S 19/52* (2010.01)

(52) U.S. Cl.
CPC .............. *G01S 19/28* (2013.01); *G01S 19/20* (2013.01); *G01S 19/40* (2013.01); *G01S 19/52* (2013.01)

(58) Field of Classification Search
CPC .......... G01S 19/05; G01S 19/09; G01S 19/28; G01S 19/20; G01S 19/40; G01S 19/42; G01S 19/48; G01S 19/52

USPC ..................................................... 342/357.23
See application file for complete search history.

(56) References Cited

U.S. PATENT DOCUMENTS

| 2009/0140924 | A1 | 6/2009 | Mizuochi et al. |
| 2012/0326922 | A1* | 12/2012 | Yang ....................... G01S 19/49 342/357.3 |
| 2013/0194132 | A1* | 8/2013 | Kim ........................ G01S 19/25 342/357.64 |

(Continued)

FOREIGN PATENT DOCUMENTS

JP 2003-167043 A 6/2003

OTHER PUBLICATIONS

Extended European Search Report dated Feb. 12, 2019 in European Patent Application No. 18 19 5390.2.

*Primary Examiner* — Harry K Liu
(74) *Attorney, Agent, or Firm* — Scully Scott Murphy & Presser (57) ABSTRACT

A satellite radiowave receiving device includes a receiver and a processor. The receiver receives radiowaves from a positioning satellite. The processor performs a positioning operation based on the radiowaves received by the receiver to obtain a current position. The processor calculates an error range at the current position based on a positioning accuracy and a deviation. The positioning accuracy is obtained by combining each position of a plurality of positioning satellites and receiving state of radiowaves from each of the plurality of positioning satellites, and the deviation is a deviation of the current position and a predicted position calculated in accordance with a travelling state of the satellite radiowave receiving device.

12 Claims, 6 Drawing Sheets

(56) References Cited

U.S. PATENT DOCUMENTS

2018/0313653 A1* 11/2018 Sakai ................... G07C 5/0808

* cited by examiner

SATELLITE RADIOWAVE RECEIVING DEVICE, ELECTRONIC TIMEPIECE, METHOD FOR CONTROLLING POSITIONING OPERATIONS, AND STORAGE DEVICE

BACKGROUND

The present invention relates to a satellite radiowave receiving device, an electronic timepiece, a method for controlling a positioning operation, and a storage device.

A satellite radiowave receiving device (positioning device) receives radiowaves containing positioning information from positioning satellites and performs positioning operations. The satellite radiowave receiving device can perform positioning operations at various countries and regions of the world based on the current positions of a plurality of positioning satellites and gaps in propagation time (pseudo distance) of radiowaves transmitted from these positioning satellites.

However, the satellite radiowave receiving device sometimes perform positioning operations with low accuracy if the radiowaves are received from positioning satellites having a biased distribution due to surrounding topography, high-rise buildings etc. or if the radiowaves have been reflected on high-rise buildings etc. Depending on the usage of the obtained current position obtained by the satellite radiowave receiving device, it is not preferable to output and use positional information having an accuracy equal to or less than a reference positioning accuracy. Japanese Unexamined Patent Application Publication No. 2003-167043 discloses techniques such as comparison of positioning calculation results respectively based on different numbers of acquired positioning satellites used for positioning, and accuracy determination using DOP (Dilution of Precision), which represents reduction in positioning accuracy according to the positions of positioning satellites.

However, the obtained positioning accuracy is also affected by reduced reception strength and propagation delay of radiowaves due to ionosphere or atmosphere through which radiowaves from each positioning satellite pass, walls of buildings, and the like. As a result, positioning operation based on radiowaves from a plurality of positioning satellites results in deviation of overall positioning accuracy depending on, among the positioning satellites used for positioning, the number of positioning satellites from which radiowaves of sufficient strength are received, the arrangement of positioning satellites from which radiowaves of low strength are received, and the like. Accordingly, information on the positioning accuracy of the positioning result cannot always be obtained properly simply based on the arrangement of the positioning satellites.

SUMMARY

A satellite radiowave receiving device, an electronic timepiece, a method for controlling a positioning operation, and a storage device are disclosed.

According to a preferred embodiment, there is provided a satellite radiowave receiving device including:
a receiver receiving radiowaves from a positioning satellite; and
a processor performing a positioning operation based on the radiowaves received by the receiver to obtain a current position, wherein
the processor calculates an error range at the current position based on a positioning accuracy and a deviation, the positioning accuracy being obtained by combining each position of a plurality of positioning satellites and receiving state of radiowaves from each of the plurality of positioning satellites, the deviation being a deviation of the current position and a predicted position calculated in accordance with a travelling state of the satellite radiowave receiving device.

DETAILED DESCRIPTION OF THE INVENTION

An embodiment will now be described with reference to the drawings.

Figure 1:
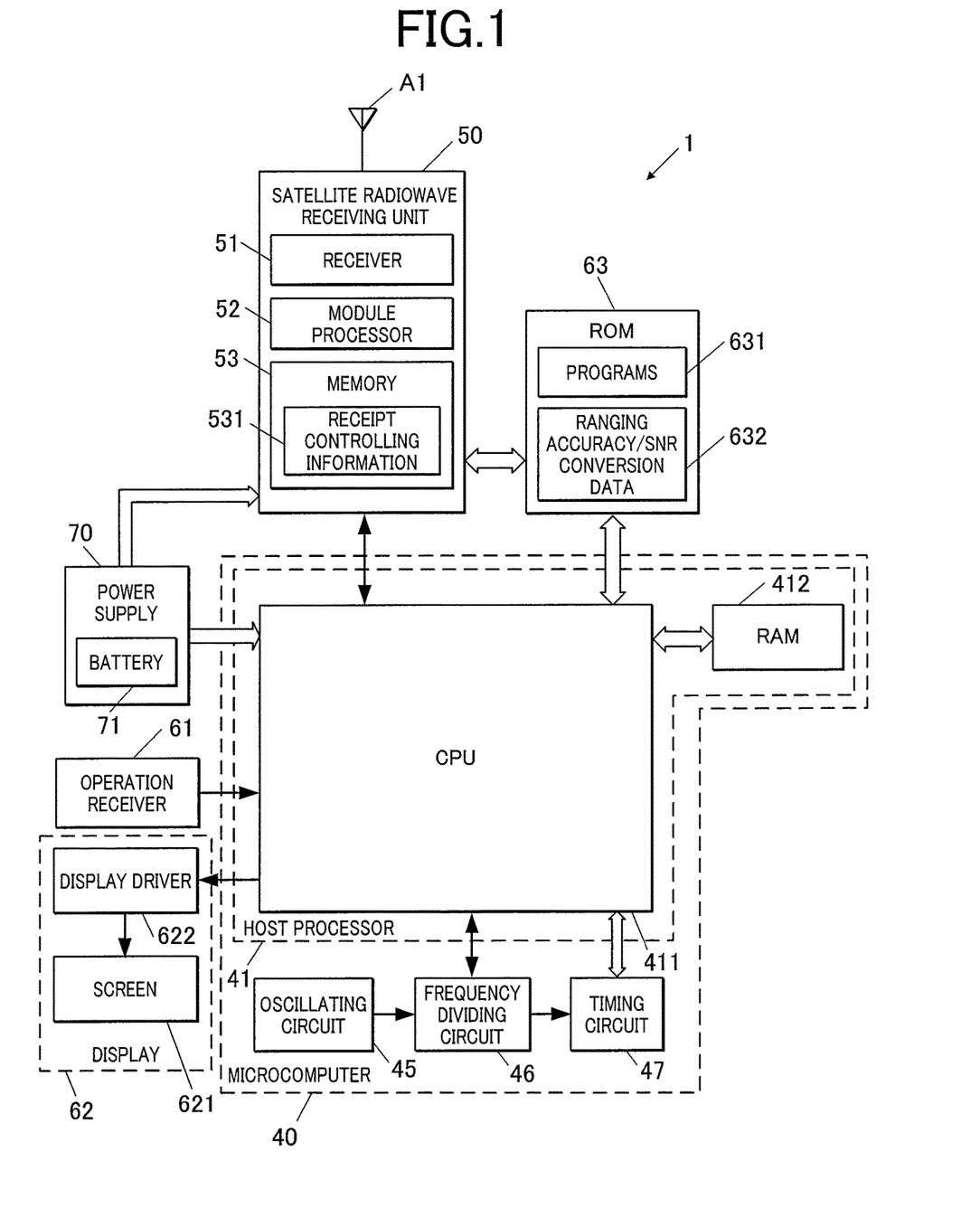
FIG. 1 is a block diagram illustrating a functional configuration of an electronic timepiece according to an embodiment of the present invention.

FIG. 1 is a block diagram illustrating a functional configuration of an electronic timepiece 1 according to an embodiment of the present invention.

An electronic timepiece 1 includes a microcomputer 40, a satellite radiowave receiving unit 50, an antenna A1, an operation receiver 61, a display 62, a read only memory (ROM) 63, and a power supply 70.

The microcomputer 40 performs various operations, such as control of the electronic timepiece 1, storage in memory, and counting of date and time. The microcomputer 40 includes a host processor 41, an oscillating circuit 45, a frequency dividing circuit 46, and a timing circuit 47.

The host processor 41 administers the overall operations of the electronic timepiece 1. The host processor 41 includes a central processing unit (CPU) 411 and a random access memory (RAM) 412.

The CPU 411 performs various calculations to control a normal display of date and time and operations relevant to the various functions of the electronic timepiece 1, such as alarm notification, timer, and stop watch functions. The CPU 411 also controls display and notification of the results of a positioning operation or a date and time obtaining operation performed by the satellite radiowave receiving unit 50.

The RAM 412 provides the CPU 411 with a working memory and stores temporary data. The temporary data includes information on time zone settings and local time settings (including daylight-saving time). The time zone settings are used to display the current date and time (local time) at a set position, such as the current position, in a region in the world. These local time settings may be updated in accordance with the current position information obtained through positioning operations. This allows the electronic timepiece 1 not to update the local time settings as described later, when it is determined that the positioning result is not sufficiently accurate. The RAM 412 may be external to the microcomputer 40. The RAM 412 may also include a rewritable non-volatile memory in addition to DRAM.

The oscillating circuit 45 generates and outputs a signal with a predetermined frequency of, for example, 32.768 kHz (clock signal). A crystal oscillator, for example, is used to generate clock signals. The crystal oscillator may be external to the microcomputer 40. The frequency of the clock signals output from the oscillating circuit 45 may contain offset errors within an allowable range for the electronic timepiece 1. The frequency of the clock signals varies, depending on an external environment, primarily temperatures.

The frequency dividing circuit 46 frequency-divides the clock signals input from the oscillating circuit 45 into frequency-division signals with a predetermined frequency division ratio, and outputs the frequency-division signals. The frequency division ratio may be varied by the CPU 411.

The timing circuit 47 counts signals with a predetermined frequency input from the frequency dividing circuit 46, which may be identical to that of the clock signals, to count and retain the current date and time. The accuracy of the date and time counted by the timing circuit 47 depends on the accuracy of the clock signals from the oscillating circuit 45, i.e., the above-mentioned offset errors and the degree of variations in the frequency of the clock signals. The date and time counted by the timing circuit 47 may deviate from an accurate date and time. The CPU 411 can modify the counted date and time based on the current date and time obtained by the satellite radiowave receiving unit 50.

The satellite radiowave receiving unit 50 is a satellite radiowave receiving device according to an embodiment of the present invention. The satellite radiowave receiving unit 50 can receive radiowaves transmitted from a positioning satellite in a global navigation satellite system (GNSS), such as Global Positioning System (GPS) of the U.S.A. The satellite radiowave receiving unit 50 processes the received radiowaves to obtain information on the current date and time and the current position. In response to a request of the host processor 41 (CPU 411), the satellite radiowave receiving unit 50 outputs requested information in a predetermined format to the host processor 41. The satellite radiowave receiving unit 50 includes a receiver 51, a module processor 52, and a memory 53.

The receiver 51 receives radiowaves transmitted from a target positioning satellite. In the receiving operation, the receiver 51 detects the radiowaves transmitted from the positioning satellite and identifies the positioning satellite and the phase of signals in the transmitted radiowaves (a navigation message). The receiver 51 tracks the radiowaves transmitted from the positioning satellite based on the identification information on the acquired positioning satellite and the phase, and continuously demodulate and receive the signals.

The module processor 52 includes a CPU and a RAM and controls the various operations of the satellite radiowave receiving unit 50. In response to an instruction of the host processor 41, the module processor 52 causes the receiver 51 to receive radiowaves from a positioning satellite at an appropriate timing, obtains necessary information from the received radiowaves, and performs various calculations for positioning to obtain the current date and time (date and time information) and the current position. The module processor 52 may be provided with a dedicated hardware circuit for various calculations. The results of the positioning may be output in a common format, such as NMEA-0183 (National Marine Electronics Association), or in a format specific to the electronic timepiece 1. The data output by the hardware circuit in a predetermined format may be processed as needed and output by the CPU. The RAM is provided on a substrate of a control chip of the module processor 52. Alternatively, the RAM may be external to the control chip. The module processor 52 can calculate a signal-to-noise (SNR) ratio of radiowaves from each positioning satellite (similar to a C/N ratio), the position and dilution of precision (DOP) of each positioning satellite, and a travelling speed from the current position when the current date and time and current position are obtained.

The memory 53 stores receipt controlling information 531, such as various parameters and received information, and control programs executed by the module processor 52 in the satellite radiowave receiving unit 50. Examples of the parameters include format data for navigation messages from each positioning satellite. The received information includes, for example, predicted orbit information (almanac) and precise orbit information (ephemeris), which are obtained from each positioning satellite. The memory 53 is a non-volatile memory and may be external to a control chip (a substrate) of the module processor 52.

The operation receiver 61 receives external input operations, such as a user operation. The operation receiver 61 includes a push-button switch and a winding crown. In response to a pressing operation of the push-button switch or a pulling-out, rotating, or pushing-back operation of the winding crown, the operation receiver 61 outputs a corresponding operational signal to the CPU 411 of the host processor 41. Alternatively, the operation receiver 61 may include a touch sensor.

The display 62 shows various pieces of information in accordance with the control of the host processor 41. The display 62 includes a display driver 622 and a screen 621. The screen 621 displays digital information on a liquid crystal display (LCD) of a segment, dot-matrix or combination type. Alternatively, the display 62 may be configured to show information with needles and a stepping motor that rotates the needles, instead of the digital display on the display screen 621. In response to a control signal from the CPU 411, the display driver 622 outputs a drive signal on the display screen 621 to show information on the display screen 621. The information appearing on the display 62 includes the date and time information (in particular, the current date and time) according to the date and time counted by the timing circuit 47, and date and time settings, set time, and measured time for the alarm notification, timer and stop watch functions. Information on the current position obtained through a positioning operation and local time settings can also be displayed.

The ROM 63 stores programs 631 and initial setting data. The programs 631 are for the host processor 41 and the module processor 52 to perform control operations. The ROM 63 may store a non-volatile memory, such as a rewritable and updatable flash memory, in addition to or in place of a mask ROM. The ROM 63 is read- and write-accessible by the host processor 41 and the module processor 52 and detachable from a mount portion, such as a slot.

The programs 631 include control programs for obtaining the current time and date and/or positioning operations. The ROM 63 contains ranging accuracy/SNR conversion data 632 that indicates the correspondence relation between the strength of radiowaves received by the satellite radiowave receiving unit 50 and the ranging accuracy corresponding to the strength of received radiowaves, i.e., the accuracy of the measured distance from a positioning satellite to the electronic timepiece 1 (the satellite radiowave receiving device). The ranging accuracy/SNR conversion data 632 may be in the form of a table of the correspondence between SNRs and ranging accuracies, or a formula or approximation formula, for calculating the ranging accuracy from a SNR. The ranging accuracy/SNR conversion data 632 may be stored in the memory 53 of the satellite radiowave receiving unit 50.

The power supply 70 supplies power from a battery 71 to various units of the electronic timepiece 1, such as microcomputer 40 and the satellite radiowave receiving unit 50, at a predetermined drive voltage. The supply or non-supply of power to the satellite radiowave receiving unit 50 can be controlled separately from power supply to the microcomputer 40 under the control of the host processor 41. The battery 71 is a replaceable dry-cell battery or a rechargeable battery and may include solar panels and an electricity charging (storing) unit.

The positioning operation of the electronic timepiece 1 according to this embodiment will now be described.

The satellite radiowave receiving unit 50 of the electronic timepiece 1 receives radiowaves from a plurality of (for example, four or more) positioning satellites to obtain navigation messages. The electronic timepiece 1 performs positioning calculations based on the received navigation messages and the timing to receive the navigation messages. In the positioning calculations, the electronic timepiece 1 calculates the accuracy of results of the positioning operation, i.e., an error range of the current position.

A navigation message received from each of four or more positioning satellites contains an ephemeris. In the positioning calculations, as is commonly known, the current position of each satellite based on the ephemeris and a difference in the timing to receive the navigation message from each positioning satellite (pseudo range) are used to calculate four unknowns, i.e., three components of the current position of electronic timepiece 1 and a component of the current time and date. This calculation is performed by an iterative calculation (successive approximation), for example, the Newton-Raphson method (Newton's method). The iterative calculation involves a numerical convergence of a predetermined initial value to an unknown value.

In the calculation of the accuracy of the results of positioning, an error range is calculated by each of two methods of calculating the accuracy described below in consideration of a gap between the current position and a predicted position, and a more appropriate error range is selected from these two calculated error ranges. The "more appropriate" indicates simply a larger error range, i.e., a lower accuracy, to cover the largest error range that can be expected. The above-mentioned predicted position is obtained based on a positional relation among a plurality of positioning satellites from which radiowaves are received, the receiving state of radiowaves from each positioning satellite, and the moving state (travelling state) of the electronic timepiece 1 (the satellite radiowave receiving device).

Figure 2:
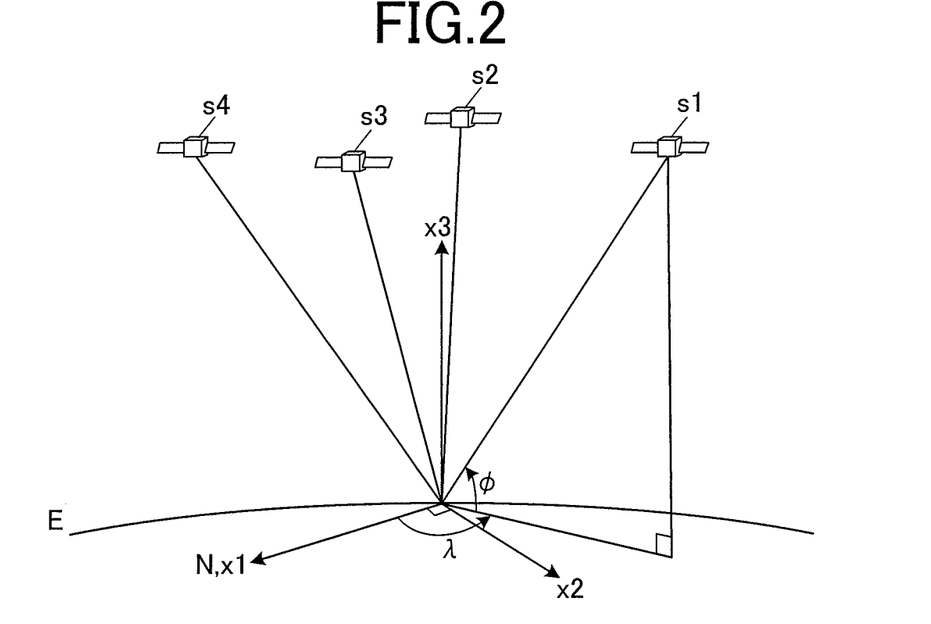
FIG. 2 illustrates a first method of calculating accuracy.

FIG. 2 illustrates a first method of calculating the accuracy of the electronic timepiece 1 according to this embodiment.

In the first method of calculating the accuracy, a first error range is calculated based on the state of radiowaves received from positioning satellites.

For a positioning satellite from which radiowaves can be received, its relative direction to the current position is determined with an elevation angle $\Phi$ and an azimuth angle $\lambda$. The elevation angle $\Phi$ is an angle between the line connecting the current position and the positioning satellite and a horizontal plane E; a direction $x_3$ is perpendicular to the horizontal plane E. The azimuth angle $\lambda$ is an angle between the component on the horizontal plane E of the line connecting the current position and the positioning satellite and the north pole direction N; the north pole direction N is defined by the direction $x_1$ and the direction perpendicular to the direction $x_1$ on the horizontal plane E is defined by a direction $x_2$. A more appropriate distribution of a plurality of positioning satellites from which radiowaves are received results in obtaining more accurate three components of the current position and a more accurate time component. In other words, an uneven distribution of a plurality of positioning satellites with respect to the current position results in a lower positioning accuracy.

The dilution of precision (DOP) used to evaluate a positioning accuracy is represented by $D = A^T \cdot A$ on a matrix A (x) of n rows and 4 columns that consists of three directional components ($x_{ij}$, j=1 to 3) relative to the current position of each positioning satellite $s_i$ (i=1 to n, n represents the number of positioning satellites used for positioning) and a time component ($x_{i4}$, $x_{i4}$=1), i.e., the diagonal component of the inverse matrix $D^{-1} = U$ of the matrix D of four rows and four columns having j and k components which are expressed with $D_{jk} = \Sigma_{(i=1-n)}(x_{ij} \cdot x_{ik})$. This indicates that DOP solely depends on the position of each positioning satellite $s_i$. These three directional components having a vector length of 1 can be calculated with $(x_{i1}, x_{i2}, x_{i3}) = (\cos \lambda_i \cdot \cos \Phi_i, \sin \lambda_i \cdot \cos \Phi_i, \sin \Phi_i)$. HDOP, a horizontal DOP, is expressed by $(|u_{11}| + |u_{22}|)^{1/2}$ using diagonal components $u_{ii}$ of the matrix U; VDOP, a vertical DOP, is expressed by $(|u_{33}|)^{1/2}$; PDOP, a positional DOP, is expressed by $(\Sigma_{(i=1\ to\ 3)}|u_{ii}|)^{1/2}$. These DOP values are approximately 1 under the best conditions; greater values indicate a lower accuracy.

However, in fact, the distribution of the positioning satellites with lower DOP values increases a difference in angle among the positioning satellites viewed from the current position, which normally results in inclusion of a positioning satellite having a small elevation angle $\Phi_i$. Meanwhile, smaller elevation angle $\Phi_i$ tends to result in reduced receiving strength of the radiowaves. The first method of calculating the accuracy of the electronic timepiece 1 according to this embodiment involves weighting of a variance in relative position of each positioning satellite with the corresponding SNR based on a combination of the position of each positioning satellite (a relative position with respect to the current position) and the ranging accuracy corresponding to the strength of radiowaves received from the each positioning satellite.

Figure 3:
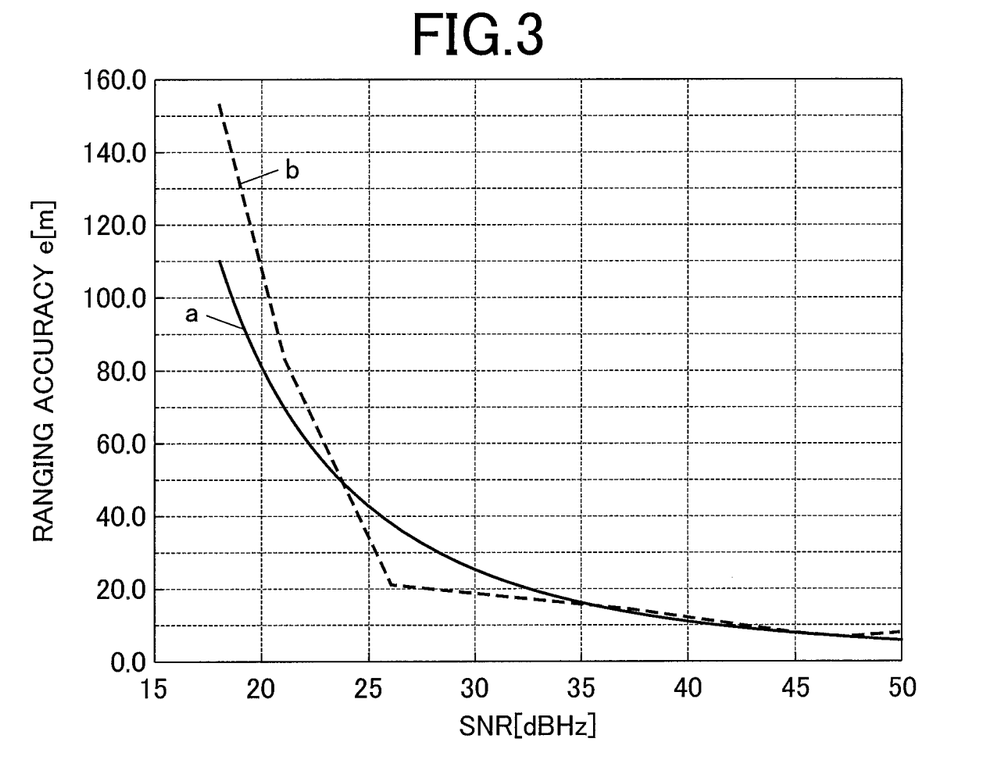
FIG. 3 illustrates a relation between a signal-to-noise ratio (SNR) of radiowaves received from a positioning satellite and a ranging accuracy for the positioning satellite from which radiowaves are received at the SNR.

FIG. 3 illustrates a relation between a SNR of radiowaves received from a positioning satellite and a ranging accuracy for the positioning satellite from which radiowaves are received at the SNR.

As a SNR [dBHz] reduces, the accuracy for determining a pseudo range (a ranging accuracy $e_i$ [km]) also deteriorates (the value increases), i.e., the maximum deviation expected at a position obtained through positioning increases. As shown by the solid line (a) in FIG. 3, the ranging accuracy $e_i$ improves (its value decreases) in accordance with an exponential function, as the SNR increases. This relation is stored as the ranging accuracy/SNR conversion data 632 in the ROM 63 before shipment of the product in the form of table data obtained based on measurements (or examination) or a calculating formula. In the case where the ranging accuracy/SNR conversion data 632 is in the form of table data, the ranging accuracy $e_i$ corresponding to the intermediate value among the SNR values in the table may be calculated through interpolation. In the case where the ranging accuracy/SNR conversion data 632 in the form of calculating formula, the calculating formula may be an approximation formula provided that required accuracy is retained. The calculating formula may be simply expressed by a combination of several straight lines, for example, as shown by the broken line (b) in FIG. 3.

As described above, radiowaves are received from a plurality of positioning satellites to perform positioning operations. A combination of SNRs or ranging accuracies $e_i$ of positioning satellites causes a variation in the maximum deviation that may be included in the final results of the positioning operation. Here, the first error range is calculated as follows: Each element $(x_{ij} \cdot x_{ik})$ of each component $D_{jk} = \Sigma_{(i=1 \text{ to } n)}(x_{ij} \cdot x_{ik})$ of the matrix D is weighted with the ranging accuracy $e_i$ corresponding to the SNR for each positioning satellite $s_i$, i.e., with $e_i^{-2}$. Using the weighting matrix W of n rows and n columns having diagonal components $sw_{ii}$ set to $e_i^{-2}$ ($w_{ii} = e_i^{-2}$) and having all non-diagonal components set to "0", the positioning accuracy weighted with a receiving strength by the inverse matrix $D^{-1} = U$ of the matrix $D = A^T \cdot W \cdot A$ (each component $D_{jk} = \Sigma_{(i=1 \text{ to } n)}(x_{ij} \cdot w_{ii} \cdot x_{ik})$) is calculated as a first expected deviation $\Delta x$ (a first error range). As descried above, the DOP values under the best conditions are approximately 1. The first estimated deviation $\Delta x$ is in the same order as that of the square root of the square of a ranging accuracy $e_i$, i.e., the same order as that of the ranging accuracy $e_i$. Alternatively, the first estimated deviation $\Delta x$ may be suitably multiplied by a predetermined factor.

As described above, the first estimated deviation $\Delta x$ calculated by the first method of calculating the accuracy is obtained directly from the receiving strength and the distribution of positioning satellites.

Figure 4:
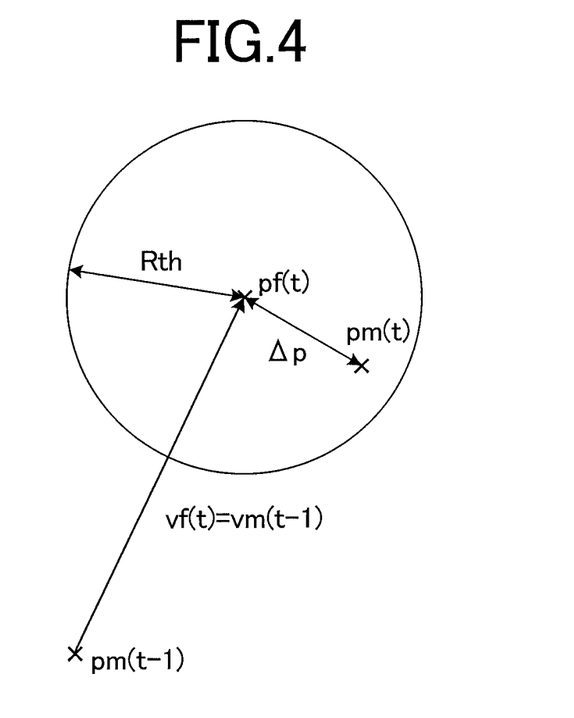
FIG. 4 illustrates a second method of calculating the accuracy.

FIG. 4 illustrates a second method of calculating the accuracy of the electronic timepiece 1 according to this embodiment.

In the second method of calculating the accuracy, a second error range is determined based on a deviation of the current position with respect to a predicted position.

After obtaining positional information several (at least two) times, the travelling speed of the electronic timepiece 1 (the satellite radiowave receiving device) can be calculated based on the changes of positions. In the case where no large acceleration is generated, the next calculated position reached after travelling from the last position (calculated position) at this travelling speed can be predicted. Comparison of the predicted position with the next calculated position can obtain a deviation in the result of the positioning operation. Let a predicted speed of (t) be equal to the last measured speed vm (t−1). The last measured speed vm (t−1) is obtained by dividing a difference between calculated positions pm(t−1) and pm(t−2), which are the calculated results of the last two positioning operations, by a difference $\Delta t$ in time between the last two positioning operations. The predicted speed vf(t) can be calculated as follows: vf(t)=vm (t−1)=(pm(t−1)−pm(t−2))/$\Delta t$.

The predicted speed of (t), which is obtained as shown above, is used to obtain a predicted position pf(t) as follows: pf(t)=pm(t−1)+vf(t)·$\Delta t$. The deviation between the predicted position pf(t) and the calculated position pm(t) represents a second estimated deviation $\Delta p$ (second error range), which is calculated as follows: $\Delta p$=|pf(t)−pm(t)|.

Instead of calculation of a predicted position pf (t) using the last calculated position pm(t−1), a more likely presumed position pe(t−1) may be obtained using the calculated position pm(t−1) and the last predicted position pf(t−1) to calculate a predicted position pf(t) as follows: pf(t)=pe(t−1)+vf(t)·$\Delta t$. The presumed position pe(t−1) may be obtained by an appropriate means, for example, Kalman filter. Even if the Kalman filter is not used, the presumed position pe(t) can be obtained by weighing the predicted position and the calculated position properly in accordance with the deviation therebetween, like Kalman filter's error covariance matrix.

Alternatively, in the calculation of the predicted position pf(t), acceleration may be used based on a difference between speeds. Alternatively, if a travelling speed in the direction of the line connecting a positioning satellite and the electronic timepiece can be measured as a variation in frequency due to the Doppler effect based on the positional relation between the positioning satellite and the electronic timepiece, the travelling speed may be calculated based on the variation in frequency. Alternatively, not only the last two (or three, if acceleration is generated) calculated positions but also the historical information of positions may be statistically processed to find a travelling tendency.

In the second method of calculating the accuracy, deviation between the current position predicted based on speeds and their history and the actually calculated position and the impact of the deviation may be used.

The electronic timepiece 1 according to this embodiment further compares a first estimated deviation $\Delta x$ and a second estimated deviation $\Delta p$ and selects a greater one as a presumed error range $\varepsilon$ (an error range at the current position). The electronic timepiece 1 determines quality of the positioning result, that is, whether the presumed error range $\varepsilon$ is greater (wider) than a predetermined reference Rth (a predetermined reference range), and determines whether the results of the positioning operation is acceptable (OK) or not (NG) based on the results of determination on the presumed error range $\varepsilon$, in other words, whether the positioning accuracy is acceptable or not. The predetermined reference Rth may be fixed (for example, 20 m) or varied in accordance with application to which the positional information is output or in accordance with application settings. The application settings may be changed through a predetermined input operation received by the operation receiver 61 or through a setting request of an application program being executed.

Figure 5:
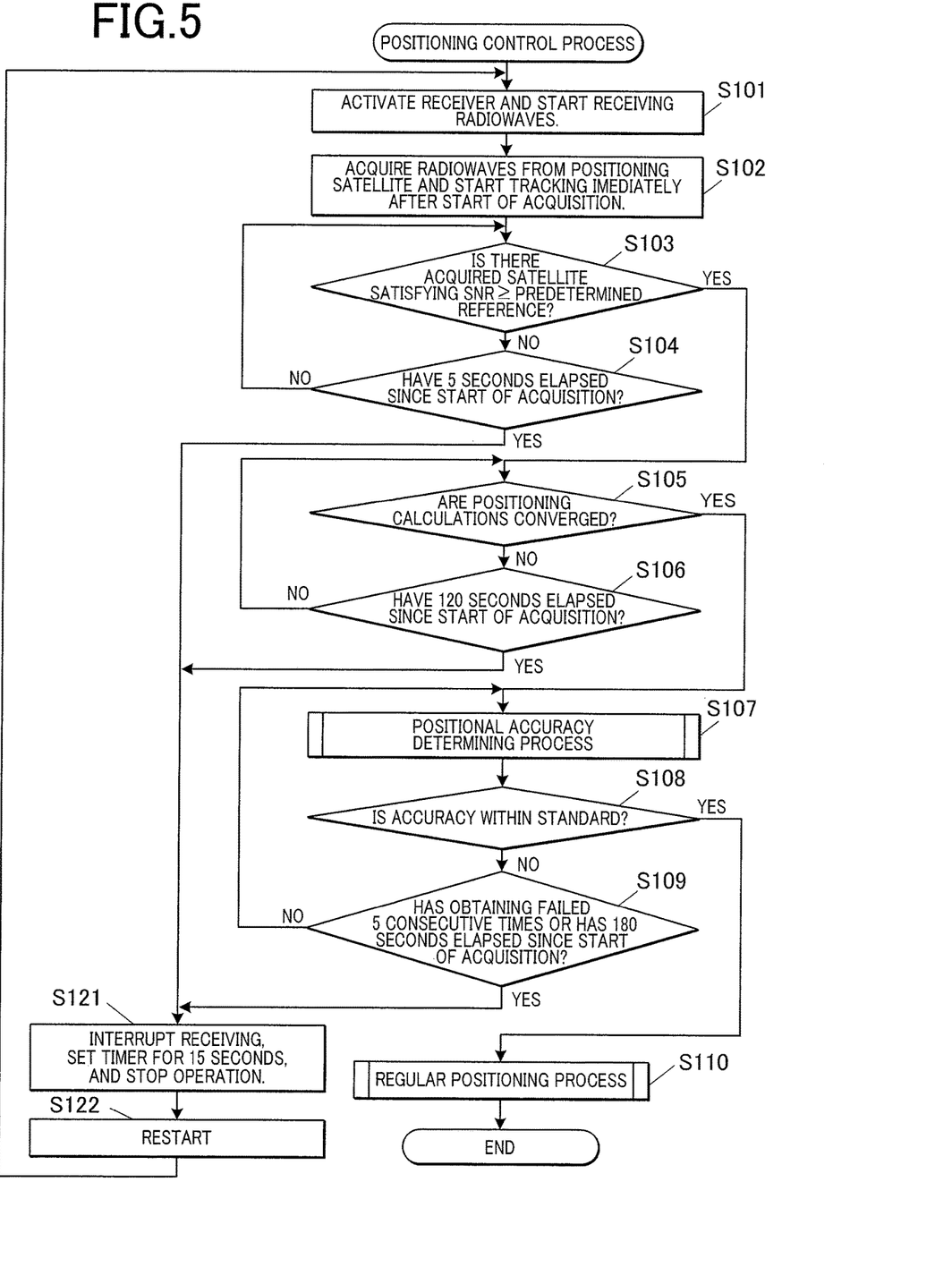
FIG. 5 illustrates a procedure of a positioning control process.

FIG. 5 is a flowchart illustrating a procedure performed by the module processor 52 for controlling the positioning process in the electronic timepiece 1 according to this embodiment.

The positioning control process starts in response to a positioning command from the host processor 41.

At the start of the positioning control process, the module processor 52 activates the receiver 51 to start receiving radiowaves from positioning satellites (Step S101). The module processor 52 causes the receiver 51 to start an acquiring operation of radiowaves from positioning satellites and sequentially track the acquired radiowaves (Step S102). If data of effective ephemeris and almanac are retained in advance, the module processor 52 may limit the positioning satellites to be acquired or set the priority order thereof, depending on the last positioning result and, if necessary, the elapsed time from the last positioning operation.

The module processor 52 determines whether there is a radiowave from the acquired and tracked positioning satellites having an SNR equal to or greater than a predetermined reference (Step S103). If it is determined that there is no radiowave having an SNR equal to or greater than the predetermined reference ("NO" at Step S103), the module processor 52 determines whether 5 seconds have elapsed since the start of the acquiring operation (Step S104). If it is determined that 5 seconds have not elapsed ("NO" at Step S104), the module processor 52 returns the process to Step S103. If it is determined that 5 seconds have elapsed ("YES" at Step S104), the process by the module processor 52 proceeds to step S121.

If it is determined that there is a radiowave having an SNR equal to or greater than the predetermined reference ("NO" at Step S103), the module processor 52 starts positional calculation by acquiring radiowaves from the necessary number of positioning satellites for positioning calculation and determines whether numerical convergence is made (step S105). That is, the module processor 52 starts the positioning calculation only when the strength of radiowaves received from at least one positioning satellite is equal to or greater than the reference. Once converged, the positioning calculation is performed every second regardless of whether or not convergence is made. If it is determined that convergence has failed, ("NO" at step S105), the module processor 52 determines whether 120 seconds have elapsed since the start of the acquiring operation (step S106). If it is determined that 120 seconds have not elapsed ("NO" at Step S106), the module processor 52 returns the process to Step S105. If it is determined that 120 seconds have elapsed ("YES" at Step S106), the process by the module processor 52 proceeds to step S121.

If it is determined in step S105 that convergence is made ("NO" at step S105), the module processor 52 calls and executes a positioning accuracy determining process (Step S107). The module processor 52 determines whether the positioning accuracy is within a reference (step S108) according to the determination results obtained by the positioning accuracy determining process. If it is determined that the positioning accuracy is not within the reference (including the case where convergence failed) ("NO" at step S108), the module processor 52 determines whether the convergence has failed (or positioning operation has failed) five times consecutively (or for five seconds or more) or 180 seconds have elapsed since the start of the acquiring operation (Step S109).

If it is determined that convergence has not failed five times consecutively and that 180 seconds have not elapsed since the start of the acquiring operation ("NO" at Step S109), the module processor 52 returns the process to Step S107. If it is determined that convergence has failed five times consecutively or that 180 seconds have elapsed since the start of the acquiring operation ("YES" at Step S109), the process by the module processor 52 proceeds to step S121.

In the determination process at step S108, if it is determined that the positioning accuracy is within the reference ("YES" in step S108), the module processor 52 calls and executes a regular positioning process (step S110). After the regular positioning process, the module processor 52 terminates the positioning control process.

At Step S121 after Steps S104, S106, or S109, the module processor 52 interrupts the operation by the receiver 51 and stops the operation of the module processor 52 by setting a 15-second timer (Step S121). The operation by an oscillating circuit (not shown) in the satellite radiowave receiving unit 50 is maintained to be used for counting operation of the 15-second timer. Further, the refresh operation of the RAM may be maintained based on the clock signal from the oscillating circuit. Alternatively, it is also possible to save necessary temporary data of the RAM in a nonvolatile memory so as to temporarily stop the operation by the RAM. The module processor 52 is restarted after 15 seconds by the 15-second timer, performs a restart operation (step S122), and then returns the process to step S101.

Figure 6:
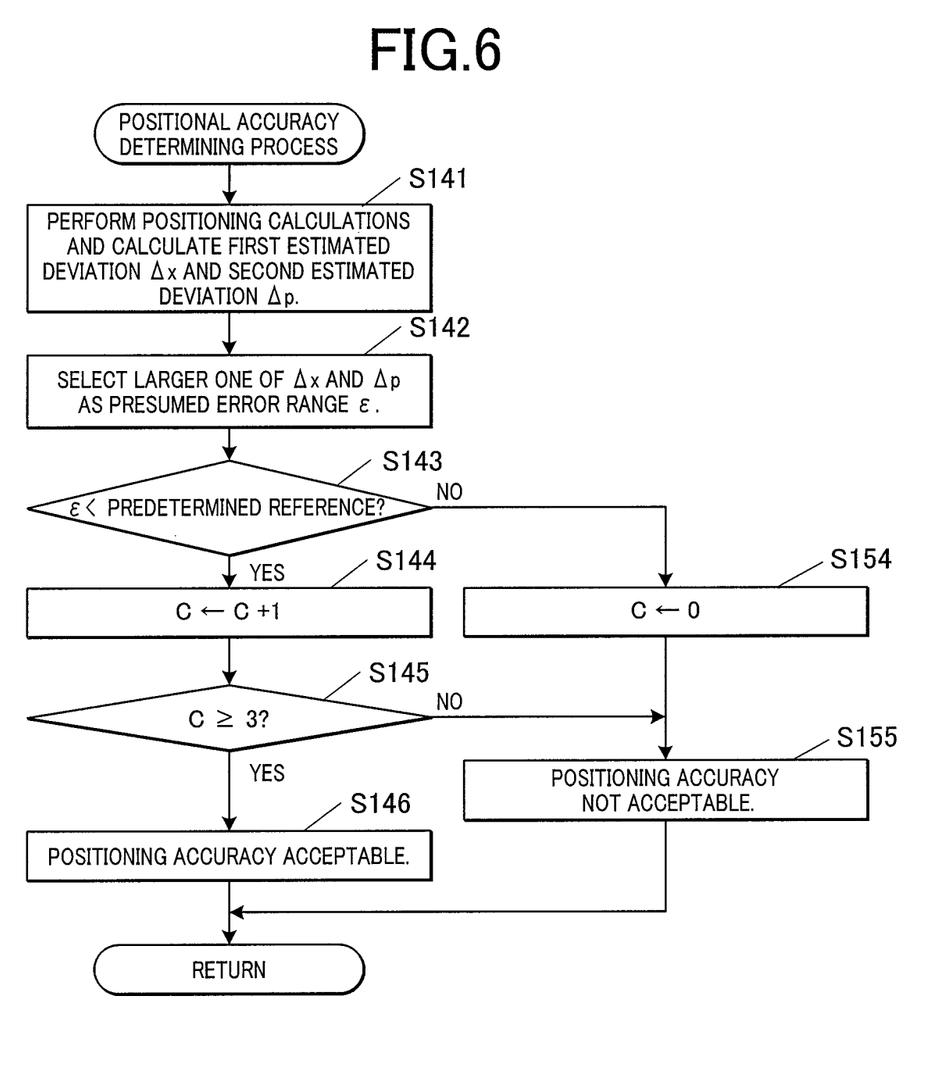
FIG. 6 illustrates a procedure of controlling positioning accuracy determination process.

FIG. 6 is a flowchart illustrating a procedure for controlling the positioning accuracy determining process called in the positioning control process.

If the positioning accuracy determining process is called, the module processor 52 obtains the positioning calculation results to calculate the above-described first estimated deviation Δx and the second estimated deviation Δp (Step S141). The module processor 52 compares the first estimated deviation Δx and the second estimated deviation Δp, and sets the larger one as a presumed error range ε (Step S142).

The module processor 52 determines whether the presumed error range ε is less than the predetermined reference Rth (Step S143). If it is determined that the presumed error range ε is less than the reference Rth ("YES" at step S143), the module processor 52 adds 1 to a count c (step S144). The module processor 52 determines whether or not the count c is 3 or more (step S145). If it is determined that the count c is 3 or more (that is, if it is determined that the presumed error range ε is less than the predetermined Rth for three seconds (a predetermined time) or more) ("YES" at step S145), the module processor 52 determines that the positioning accuracy, which is the result of positioning, is acceptable (step S146). Then, the module processor 52 terminates the positioning accuracy determining process and returns the process to the positioning control process.

If it is determined that the count c is not "3" or more (that is, 1 or 2) ("NO" at step S145), the module processor 52 determines that the positioning accuracy is not acceptable (step S155). Then, the module processor 52 terminates the positioning accuracy determining process and returns to the positioning control process.

If it is determined in step S143 that the presumed error range ε is not less than the reference Rth (that is, equal to or greater than the reference Rth) ("NO" at step S143), the module processor 52 sets the count c to 0 (zero) (step S154). Then, the process by the module processor 52 proceeds to step S155. The module processor 52 determines that the positioning accuracy is not acceptable (step S155).

Figure 7:
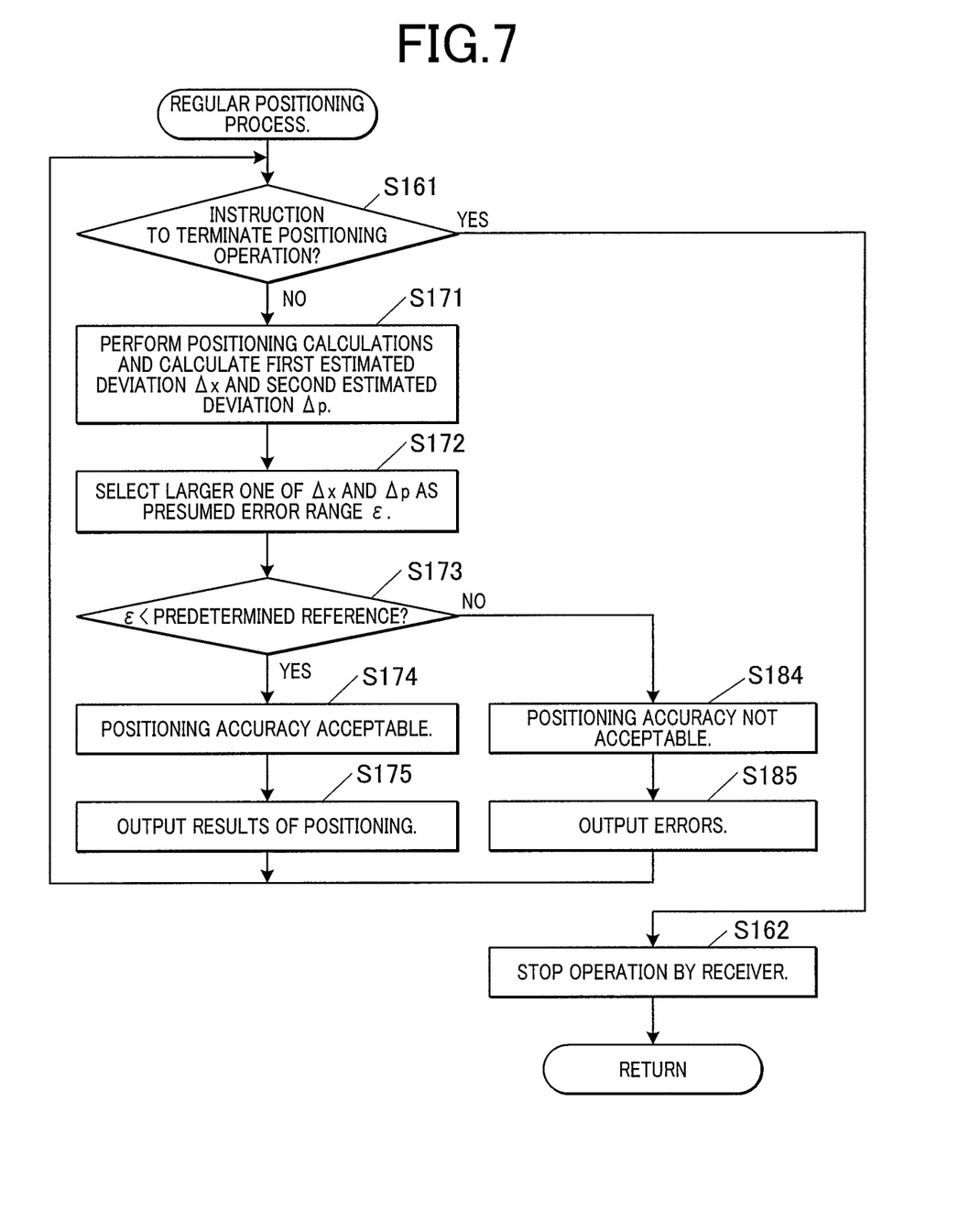
FIG. 7 illustrates a procedure of controlling regular positioning process.

FIG. 7 is a flowchart illustrating a procedure for controlling the regular positioning process called in the positioning control process.

If the regular positioning process is called, the module processor 52 determines whether a positioning termination instruction has been obtained from the host processor 41 (step S161). The positioning termination instruction is sent from the host processor 41 to the module processor 52 if the operation receiver 61 received a predetermined operation, if the voltage supplied from the power supply 70 is reduced to a voltage less than a reference voltage, and the like. If it is determined that a positioning termination instruction has been obtained ("YES" at step S161), the module processor 52 causes the receiver 51 to stop the receiving operation (step S162), terminates the regular positioning process, and returns the process to the positioning control process.

If it is determined that a positioning termination instruction has not been obtained ("NO" at step S161), the module processor 52 obtains the positioning calculation results and calculates the first estimated deviation Δx and the second estimated deviation Δp (Step S171). The module processor 52 sets a larger one of the first estimated deviation Δx and the second estimated deviation Δp as a presumed error range ε (Step S172).

The module processor 52 determines whether the presumed error range ε is less than the predetermined reference Rth (step S173). If it is determined that the presumed error range ε is less than the reference Rth ("YES" at step S173), the module processor 52 determines that the positioning accuracy is acceptable (step S174) and outputs the positioning result (step S175). Then, the module processor 52 returns the process to step S161.

If it is determined that the presumed error range ε is not less than the reference Rth ("NO" at step S173), the module processor 52 determines that the positioning accuracy is not acceptable (step S184) and outputs an error (step S185). The module processor 52 may output both determination result and positioning result even if the positioning accuracy is determined to be unacceptable. Then, the module processor 52 returns the process to step S161.

As described above, the satellite radiowave receiving unit 50 in the electronic timepiece 1 according to this embodiment includes the receiver 51 which receives radiowaves from positioning satellites and the module processor 52 which performs positioning operations based on the radiowaves received by the receiver 51 to obtain the current position. The module processor 52 calculates the presumed error range ε as the error range at the current position based on the positioning accuracy and the deviation. The positioning accuracy is obtained by combining each position of a plurality of positioning satellites and receiving state of radiowaves received from each of the plurality of positioning satellites. The deviation is a deviation of the obtained current position and the predicted position calculated in accordance with the travelling state of the electronic timepiece 1

Thus, when accuracy of the quantitative positioning result is calculated, the receiving states of radiowaves from the plurality of positioning satellites are estimated not based on an overall average or minimum value of the receiving strength, but based on respective receiving strength. This allows the satellite radiowave receiving unit 50 to quantitatively evaluate an error range ε more properly. That is, the satellite radiowave receiving unit 50 can obtain information on positioning accuracy of the positioning result more properly.

The module processor 52 calculates the first estimated deviation Δx for positioning accuracy and the second estimated deviation Δp based on deviation between the predicted position and the current position. The module processor 52 calculates a presumed error range ε based on the first estimated deviation Δx and the second estimated deviation Δp. As shown above, several causes of error and, in particular, impacts of receiving strength on errors are considered properly. This allows the satellite radiowave receiving unit 50 to obtain a more appropriate error range.

The module processor 52 selects, as a presumed error range ε, a larger one of the first estimated deviation Δx and the second estimated deviation Δp. Such a simple process for presuming the maximum error allows the satellite radiowave receiving unit 50 to reliably use only data having necessary accuracy without underestimation of deviation.

The electronic timepiece 1 according to this embodiment includes the ROM 63 (or the memory 53) which stores correspondence relation between the strength of radiowaves received from a positioning satellite and the ranging accuracy $e_i$ of the positioning satellite based on the strength of radiowaves received from the positioning satellite, as ranging accuracy/SNR conversion data 632. The module processor 52 calculates the first estimated deviation Δx based on a combination of a relative position x of each of the positioning satellites with respect to the current position, which are used to calculate the current position, and a ranging accuracy $e_i$ corresponding to the strength of radiowaves received from the positioning satellites.

As described above, in addition to the distribution of positioning satellite (DOP), the ranging accuracy $e_i$ is used in the calculation of the first estimated deviation Δx. This allows the satellite radiowave receiving unit 50 to estimate a positioning accuracy in consideration of not only the distribution of positioning satellites but also the impact of the strength of radiowaves received from each of the positioning satellites.

The module processor 52 weights a variance in relative positions to the current positions of the positioning satellites with a ranging accuracy $e_i$ to calculate the first estimated deviation Δx. The ranging accuracy corresponding to the SNR of each positioning satellite is reflected to determine the first estimated deviation Δx, as described above. This allows the satellite radiowave receiving unit 50 to obtain a quantitative error range more properly.

The module processor 52 calculates a travelling speed of the electronic timepiece 1 (the satellite radiowave receiving unit 50) based on the results of the past positioning operations and calculates the position as a new predicted position in the case where the electronic timepiece 1 traveled from the last calculated position at the calculated travelling speed. Thus, even by calculating the current position using a simple prediction model, the satellite radiowave receiving unit 50 can appropriately obtain a predicted position relatively easily if prediction is performed at a short time interval. That is, it is possible to appropriately and quantitatively evaluate the error range.

The module processor 52 determines whether the presumed error range ε is less than a predetermined reference Rth and determines whether the positioning result is acceptable (OK) or not (NG) based on the determination results of the presumed error range ε. As described above, the satellite radiowave receiving unit 50 does not output the numerical value of the presumed error range ε, but obtains the result of comparison with the reference Rth. This allows the satellite radiowave receiving unit 50 to easily determine whether the positioning result may be used in a specific application program etc.

The setting of the reference Rth can be changed. The required positioning accuracy may be different depending on the program in which the positioning result is used, however, by differently setting the reference Rth depending on the kind of the programs, the satellite radiowave receiving unit 50 can easily obtain a proper determination result used in a program which uses the positioning result.

The module processor 52 determines that the accuracy of positioning result is acceptable if the presumed error range ε is less than the predetermined Rth for more than three seconds. That is, the positioning accuracy is determined to be acceptable only when the positioning result has been obtained stably with high accuracy. This allows the satellite radiowave receiving unit 50 to reduce the impact of temporary fluctuation and to determine whether a positioning operation is performed stably with high accuracy.

In particular, determination to be "OK" is suspended at the start of positioning operation until the positioning result is stabilized. This allows the satellite radiowave receiving unit 50 to eliminate apparently proper position(s) resulting from problems of initial settings for convergence calculation and the like, to stably obtain a really accurate position, and to evaluate its error range.

The electronic timepiece 1 according to this embodiment includes the satellite radiowave receiving unit 50, the timing circuit 47 counting time and date, and the display 62 that can display time and date counted by the timing circuit 47.

The electronic timepiece 1 can obtain positioning results so that the positioning accuracy can be evaluated more properly as described above. As a result, it is possible to avoid displaying an incorrect position and, in addition, to eliminate the possibility of an erroneous setting of local time more reliably.

The method of controlling the positioning according to this embodiment includes a positioning calculating step and an error range calculating step. The positioning calculating step involves positioning operations based on radiowaves received by the receiver 51 to obtain the current position. The error range calculating step involves calculating the error range of the current position in consideration of the positional relation among a plurality of positioning satellites from which radiowaves are received, the state of radiowaves received from each positioning satellite, and a gap between the obtained current position and a predicted position calculated in accordance with the moving state of the satellite radiowave receiving device. As described above, in the case of performing positioning, it is possible to more appropriately obtain information on the positioning accuracy of the positioning result by calculating a more appropriate error range. This allows to determine easily whether the positioning result can be used and to evaluate results in the case where the positioning result is used.

The programs 631 that perform the method of controlling the positioning are installed and executed in a computer. This allows the processor to perform quantitative calculation process of error range readily and properly by software. As a result, the computer can obtain information on positioning accuracy of the positioning result more properly.

The present invention should not be limited to the above embodiment and various modifications can be made.

For example, in the above embodiment, the presumed error range $\varepsilon$ is calculated based on both the first estimated deviation $\Delta x$ and the second estimated deviation $\Delta p$. Alternatively, first expected deviation $\Delta x$ may be calculated further based on a deviation from the predicted position as an offset position.

A parameter other than the first estimated deviation $\Delta x$ and the second estimated deviation $\Delta p$ may be calculated and used as the estimated deviation. For example, the estimated deviation may be a value in the longitudinal direction of an error range (error ellipse) in the GST message format (Pseudorange Noise Statistics) in NMEA-0183, or a larger one of a standard deviation for latitude errors and a standard deviation for longitude errors obtained according to the error range. Alternatively, instead of weighing calculation, bias of overall positioning results may be calculated using offset values set in directions of respective axes ($x_1$ to $x_3$) based on the received strength of radiowaves. Even in these cases, the two estimated deviations are calculated based on all of the followings: the distribution of positioning satellites, the receiving state of the radiowaves from each of the positioning satellites, and the deviation between the current position and the predicted position based on the results of past positioning operations.

In the above embodiment, a larger one of the first estimated deviation $\Delta x$ and the second estimated deviation $\Delta p$ is determined as the presumed error range $\varepsilon$, however, the presumed error range $\varepsilon$ is not limited to this. For example, the presumed error range $\varepsilon$ may be an average thereof, or a weighted average obtained by changing the degree of weighting of the second estimated deviation $\Delta p$ according to the travelling acceleration and the change state thereof. An additional acceleration sensor and the like may be provided so as to set the weighting based on the acceleration and the change state.

In the above embodiment, the positioning accuracy is determined to be "OK" only after consecutively obtaining three error ranges less than the reference Rth since the first positioning result is obtained. After that, positioning accuracy is determined to be "OK" or "NG" for each positioning operation. However, the present invention is not limited to this. The positioning accuracy may be determined to be "OK" when the presumed error range $\varepsilon$ less than the first reference Rth is obtained. Alternatively, once determined to be "NG", the positioning accuracy may be set to be "NG" until a presumed error range $\varepsilon$ less than the reference Rth is again obtained a predetermined number of times (three times).

The reference Rth may be separately set in the horizontal direction and in the vertical direction.

In the above embodiment, the positioning controlling operation of the satellite radiowaves receiving unit 50 in the electronic timepiece 1 is described. Alternatively, the satellite radiowaves receiving unit 50 may be provided in various electronic devices other than the electronic timepiece 1. Alternatively, the satellite radiowaves receiving unit 50 may be a single module for receiving satellite radiowaves installed in the electronic device.

In the above description, the programs 631 for controlling the receipt of radiowaves from positioning satellites according to the present invention at the time of obtaining current date and time information are stored in a computer-readable storage device (recording medium), such as a nonvolatile memory, including a flash memory, and the ROM 63, including a mask ROM, though not limitative in any way. Any other type of computer-readable recording medium may be used, for example, a portable recording medium, such as hard disk drive (HDD), CD-ROM, and DVD disk. The present invention is also applicable to carrier waves, a medium which provides the programs according to the present invention with data via a communication line.

It should be understood that the details of the configurations, control procedures, and display examples shown in the above embodiment can be appropriately modified without departing from the scope of the present invention.

The embodiments described above should not be construed to limit the present invention, and the claims and other equivalents thereof are included in the scope of the invention.

What is claimed is:

1. A satellite radiowave receiving device, comprising:
   a receiver receiving radiowaves from a positioning satellite; and
   a processor configured to:
   perform a positioning operation based on the radiowaves received by the receiver to obtain a current position,
      obtain a positioning accuracy by combining each position of a plurality of positioning satellites and receiving state of radiowaves from each of the plurality of positioning satellites,
      determine a deviation between a predicted position calculated in accordance with a travelling state of the satellite radiowave receiving device and the current position,
      calculate, respectively, a first error range based on the positioning accuracy and a second error range based on the deviation between the predicted position and the current position, determine a larger one of the first error range and the second error range, and set the larger one of the first error range and the second error range as an error range at the current position.

2. The satellite radiowave receiving device according to claim 1, further comprising a memory storing a correspondence relation between strength of radiowaves received from the positioning satellite and a ranging accuracy of the positioning satellite in accordance with the strength of received radiowaves, wherein the processor is configured to calculate the first error range based on a combination of a relative position relative to the current position of each of a plurality of positioning satellites used for calculating current position and the ranging accuracy in accordance with strength of radiowaves received from each of the plurality of positioning satellites.

3. The satellite radiowave receiving device according to claim 2, wherein the processor is configured to weight a variance in the relative position relative to the current position of each of the plurality of positioning satellites using the ranging accuracy and calculate the first error range.

4. The satellite radiowave receiving device according to claim 1, wherein the processor is configured to calculate a traveling speed of the satellite radiowave receiving device based on results of past positioning operation, and calculate a new predicted position which is a position of the satellite radiowave receiving device when traveled from the last calculated position at the calculated travelling speed.

5. The satellite radiowave receiving device according to claim 2, wherein the processor is configured to calculate a traveling speed of the satellite radiowave receiving device based on results of past positioning operation, and calculate a new predicted position which is a position of the satellite radiowave receiving device when traveled from the last calculated position at the calculated travelling speed.

6. The satellite radiowave receiving device according to claim 3, wherein the processor is configured to calculate a traveling speed of the satellite radiowave receiving device based on results of past positioning operation, and calculate a new predicted position which is a position of the satellite radiowave receiving device when traveled from the last calculated position at the calculated travelling speed.

7. The satellite radiowave receiving device according to claim 1, wherein the processor is configured to determine whether the error range at the current position is within a predetermined reference range and determine quality of a result of positioning operation in accordance with a result of the determination of whether the error range at the current position is within the predetermined reference range.

8. The satellite radiowave receiving device according to claim 7, wherein the reference range is set to be changeable.

9. The satellite radiowave receiving device according to claim 7, wherein, if the error range continues to be within the reference range for a predetermined time or more, the processor is configured to determine that accuracy of the positioning result is acceptable.

10. An electronic timepiece comprising:

the satellite radiowave receiving device according to claim 1;

a timing circuit counting date and time; and a display displaying the date and time counted by the timing circuit.

11. A method of controlling the positioning of a satellite radiowave receiving device including a receiver receiving radiowaves from a positioning satellite, the method comprising:

obtaining a current position by performing a positioning operation based on the radiowaves received by the receiver, obtaining a positioning accuracy by combining each position of a plurality of positioning satellites and receiving state of radiowaves from each of the plurality of positioning satellites, determining a deviation between a predicted position calculated in accordance with a travelling state of the satellite radiowave receiving device and the current position, calculating, respectively, a first error range based on the positioning accuracy and a second error range based on the deviation between the predicted position and the current position, determining a larger one of the first error range and the second error range, and setting the larger one of the first error range and the second error range as an error range at the current position.

12. A non-transitory computer readable storage device storing a program readable by a computer in a satellite radiowave receiving device including a receiver receiving radiowaves from a positioning satellite, the program causing the computer to:

obtain a current position by performing a positioning operation based on the radiowaves received by the receiver, obtaining a positioning accuracy by combining each position of a plurality of positioning satellites and receiving state of radiowaves from each of the plurality of positioning satellites, determining a deviation between a predicted position calculated in accordance with a travelling state of the satellite radiowave receiving device and the current position, calculating, respectively, a first error range based on the positioning accuracy and a second error range based on the deviation between the predicted position and the current position, determining a larger one of the first error range and the second error range, and setting the larger one of the first error range and the second error range as an error range at the current position.

* * * * *